(12) United States Patent
DeWaard (10) Patent No.: US 6,443,094 B1
(45) Date of Patent: Sep. 3, 2002

(54) METHOD AND APPARATUS FOR CLEANING THE UDDER OF A COW

(76) Inventor: Dave DeWaard, 8540 Benson, Lynden, WA (US) 98264

(*) Notice: Subject to any disclaimer, the term of this patent is extended or adjusted under 35 U.S.C. 154(b) by 0 days.

(21) Appl. No.: 09/698,433

(22) Filed: Oct. 25, 2000

Related U.S. Application Data (60) Provisional application No. 60/170,153, filed on Dec. 10, 1999.

(51) Int. Cl.⁷ .................................................. A01J 3/00
(52) U.S. Cl. .................................................. 119/14.18
(58) Field of Search .......................... 119/14.01, 14.02, 119/14.03, 14.08, 14.18, 666, 667

(56) References Cited

U.S. PATENT DOCUMENTS

| | | | | |
|---|---|---|---|---|
| 5,275,124 A | * | 1/1994 | van der Lely et al. .... | 119/14.08 |
| 5,630,379 A | * | 5/1997 | Gerk et al. .................. | 119/667 |
| 5,678,506 A | * | 10/1997 | van der Berg et al. ... | 119/14.18 |
| 5,769,025 A | * | 6/1998 | van der Lely et al. .... | 119/14.42 |
| 5,865,138 A | * | 2/1999 | van der Lely et al. .... | 119/14.02 |
| 6,079,359 A | * | 6/2000 | van der Berg ........... | 119/14.01 |
| 6,148,766 A | * | 11/2000 | van der Lely ........... | 119/14.08 |

* cited by examiner

*Primary Examiner*—Thomas Price (57) ABSTRACT

A method apparatus for teat dipping for sanitizing the udder of a cow either before or after milking. The apparatus has an extension arm with a dispersion portion so that when a cow is in a cleaning location the extension arm will extend underneath a cow's udder and dispersed cleaning fluid onto the cow's udder. A sensing system is used that detects the rotation of the parlor to determine if a cow is at a cleaning location. Further, the sensing system detects whether a cow is present in a stall of the rotary milking parlor.

10 Claims, 8 Drawing Sheets

METHOD AND APPARATUS FOR CLEANING THE UDDER OF A COW

This application claims priority from provisional application Ser. No. 60/170,153, filed Dec. 10, 1999.

FIELD OF THE INVENTION

The invention relates to a new and improved cow udder cleaning or sanitizing apparatus and method to be used in a milking parlor, and more particularly to an automated system that sprays disinfectant onto a cow's udder.

BACKGROUND

In a typical milking operation a claw is connected to the cow's udder to extract the milk by providing a low pressure to draw the milk out from the udder. When a cow is finished being milked the cow's udder must be cleaned with a disinfectant such as iodine to prevent infection. Traditionally this process is accomplished by a person who cleaned each udder by hand with a spraying device. This required having an extra person on staff and oftentimes the udder was not thoroughly cleaned.

The present invention comprises an automated cleaning system that cleans a cow's udder with a disinfectant such as iodine before or after she has been milked. The system is to be implemented in a circular milking parlor that basically consists of a circular platform about 40–100 ft. in diameter that concentrically rotates about its center. The circular platform has 20–100 slots (i.e. stalls) around the perimeter where cows stand while being milked. The cows are facing radially inward toward the center and are separated by radially extending rails. There is a fixed railing that circumferentially surrounds the circular platform and the platform rotates 360 degrees in a six to twenty minutes while the cows are being milked. After about 180 degrees of rotation from the location where the cow has entered the slot, the milking of the cow has been completed and the milking gear is automatically removed from a cow's udder.

This apparatus of the present invention comprises a movable swivel arm that is activated by sensors that cause the arm to move to a location in-between the cow's legs and spray the udder with disinfectant. The portion of the arm that extends radially inwardly between the cow's hind legs is made of a flexible, durable material. At the end of this arm portion is a nozzle for dispensing disinfectant. The cleaning apparatus remains at a fixed position at a location after from the location where the cow enters. The apparatus is mounted on a fixed railing (or other stationary structure) that circumferentially extends around the rotating circular platform and the cleaning of the cow's udder is the last part of the milking procedure before a cow backs out of a stall after about 300–350 degrees of travel from where she entered the stall.

BACKGROUND ART

The U.S. Pat. No. 5,678,506 Van der Burg et al. patent discloses the broad concept of automatically dispensing disinfectant to a cow after it has been milked. More specifically as seen in FIGS. 1 and 2, milking robot 8 is movably connected to upper frame portion 4 so it can slide left or right in FIG. 1. The position and orientation of the cow and exactly how the arm 46 gets under the cow is not completely understood. Apparently the robot arm 46 is positioned in under the cow by cylinders 47 and 52 and teat cups 53 and 54 engage the teats (see FIG. 2, plan view of the apparatus). The arms 44 and 45 are raised to engage the teats and lowered to disengage after milking.

The post milking cleaning system (as described in column 12 line 38+) as shown in FIGS. 16 and 17 comprises a spray nozzle 108 positioned at the end of robot arm 46. This spray nozzle 108 discharges a fan-shaped spray pattern forward in front of the teat cups.

The following patents also turned up in the applicant's search. These are less relevant and are grouped by manual dispensing systems, timed stationary apparatuses and chemical germicides. The manual systems include:

U.S. Pat. No. 5,711,251 Green et al, shows a germicide applicator for cow udder that utilizes a dispensing wand. Valves allow metering of both lactic acid and sodium chlorite. As seen in FIG. 1, supplies 12 and 14 each hold these liquids. Pump 16 delivers liquid through the check valves 54 and 24 and through the lines 32. The reservoir 28 contains a float switch 60. When the fluid level is low in reservoir 28 the float switch sends a signal to the OR gate 64 which emits a signal to deactivate the pressure source 58. Return line 50 allows a return passage for fluid through manual valve 54.

U.S. Pat. No. 2,731,300 Jansen, shows a cow washer that assists an operator to manually clean a cow's udder. FIGS. 5 and 6 shows a nozzle means 18 where ball 31 will cut off communication with wither nozzle 22 or 23, whichever is beneath the other. As seen in FIG. 2 the nozzle means 18 can be rotated 180 degrees to use nozzle 23 which may have a different spray width.

The timed stationary system patents include:

U.S. Pat. Nos. 5,685,262 & 5,101,770 Stevenson, shows a post-milking and pre-milking udder care system. As seen in FIGS. 2 and 3 the applicator 20 comprises nozzles 23 to dispense liquid. The dispersion of liquid through applicator 20 is controlled by the control knob 10 (FIG. 1).

U.S. Pat. No. 3,554,166 Belden, shows an udder spraying device such as the ones used in the above cited Stevenson patents U.S. Pat. Nos. 5,685,262 and 5,101,770. As seen in FIG. 3 the carriage plate 53 slides along the upper surface of a support plate 58 so the spraying unit may be positioned under the cow.

U.S. Pat. No. 1,968,564 Luks, shows a milking parlor in which there are spray nozzles directed at the cow's upper region. The spray nozzles 17 and 49 are activated by valve 61 that can be changed by lever 62.

The chemical patents are as follows:

U.S. Pat. No. 5,776,479 Pallows et al, discloses a germicidal teat dip to reduce or prevent mastitis.

U.S. Pat. No. 4,466,959 Lauermann et al, is directed to a compound for the disinfecting of teats.

U.S. Pat. No. 4,288,428 Foll et al, relates to an udder disinfecting preparation comprising an iodophor.

None of the disclosures disclose a cow udder cleaning apparatus that can be retrofitted to an existing milking parlor that consistently and accurately administers disinfectant to a cow's udder.

SUMMARY OF THE INVENTION

The present invention is a cow udder dipping apparatus which can clean or disinfect a cow's udder before or after she has been milked where the apparatus has a mounting structure which moves with respects the location of the cows to be cleaned. Located on this mounting structure is a positioning system which comprises an extension arm and actuator. The extension arm has a path of travel which is adapted to extend underneath the udder of the cow which is in a cleaning location to a cleaning position. When the extension arm is in the cleaned position a dispersion portion on the extension arm sprays cleaning or disinfecting material onto the cow's udder. The actuator then withdrawals the extension arm into a protracted position.

DETAILED DESCRIPTION OF THE PRESENT INVENTION

First there will be a brief discussion of the overview of a cow milking operation and the various stages of its operation; next there will be a brief overview of the operation of the present invention; and finally there will be a detailed description of the embodiments of the present invention. The invention relates to teat dipping or referred otherwise referred to as cow udder cleaning or cow udder sanitizing.

Figure 1:
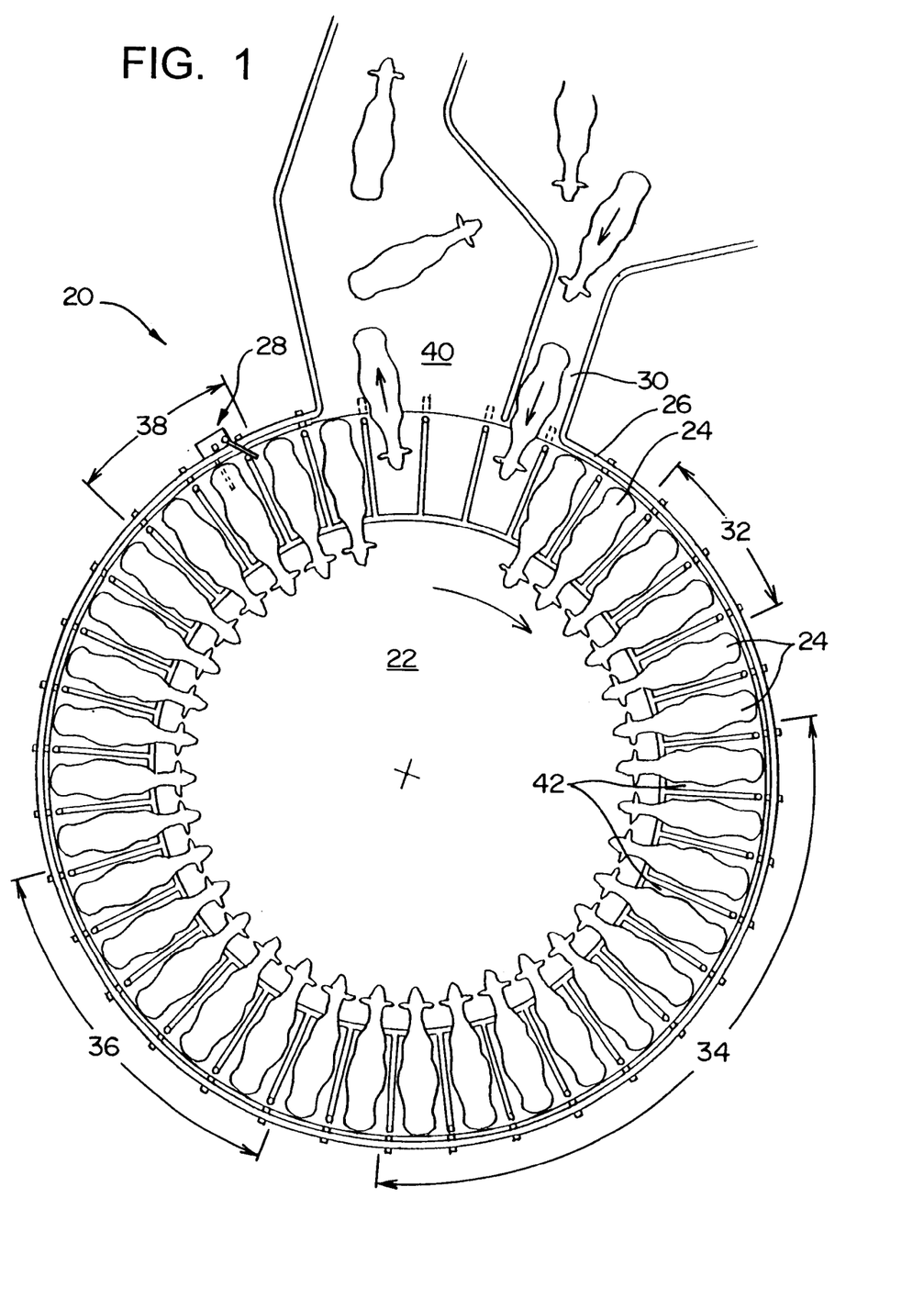
FIG. 1 shows a plan view of a prior art milking operation incorporating the present invention.

As seen in FIG. 1, there is conventional milking parlor 20 that comprises a rotating platform 22 on which the cows 24 are standing during milking, and a perimeter railing 26 surrounding the platform 22. The cow udder cleaning apparatus of the present invention is shown at 28. The platform 22 is about forty to one hundred feet in diameter and makes a complete rotation once about every six to twenty minutes. The plate 22 comprises a plurality of stalls 42 that each one comprises a milking claw and vertical bars 43.

The milking operation has six stages and there are six locations that correspond to six physical proximate locations of a cow at which certain operations are executed through the milking operation. There is the entry location 30, the claw attachment location 32, the milk extraction location 34, the claw removal location 36, the udder cleaning location 38 and finally the exit location 40. In general, the milking operation comprises the first steps where the cow steps onto the platform 22 and into a stall 42 at the entry location 30. The milking operator quickly washes the udder of the cow 24 to remove dirt and then manually places the claw upon the cow's udder at the claw attachment location 32. From hereon no manual intervention is required with the present invention 28 employed. The next phase is the milk extraction which occurs at the milking location 34, and after ninety degrees to one hundred and thirty degrees of rotation of the platform 22 the cows enter the claw removal section 36 where a spring loaded device will withdraw the claw to the side of the stall 42 clear of the cow's feet. After the claw is removed the cow's udder is to be cleaned with iodine or other disinfectant by the cow udder cleaning device 28 of the present invention. The final step occurs at the cow location 40 where the cows back out of the stall. The platform 22 rotates continuously, but the rotation is relatively slow and the cows can step off the rotating platform 22 without much difficulty.

For purposes of this application the term "clean" or "cleaning" shall be referred to as any sanitizing, spraying, or killing bacteria or remove debris on an udder surface. This includes spraying iodine or other chemical agents in liquid or powder form on to the udder.

The general operation of the cow udder cleaning device 28 is as follows. Each stall 42 is defined by two posts 44 at the perimeter of the platform 44 and radially aligned horizontal bars 45. When the platform 22 rotates, each vertical post 44 will come into contact with contact sensor 56 (to be described later) which indicates that a stall 42 is in proper position for the udder cleaning device 28 to operate. Next optical sensor 58 (also described later) detects whether a cow is occupying stall 42, and if there is a cow present an arm 46 is repositioned in-between the cow's hind legs and disinfectant is discharged from nozzle 47. Then the swing arm 46 is retracted.

There will now be a detailed description of the cow udder cleaning device 28 followed by a more detailed description of the operations of the same.

Figure 2:
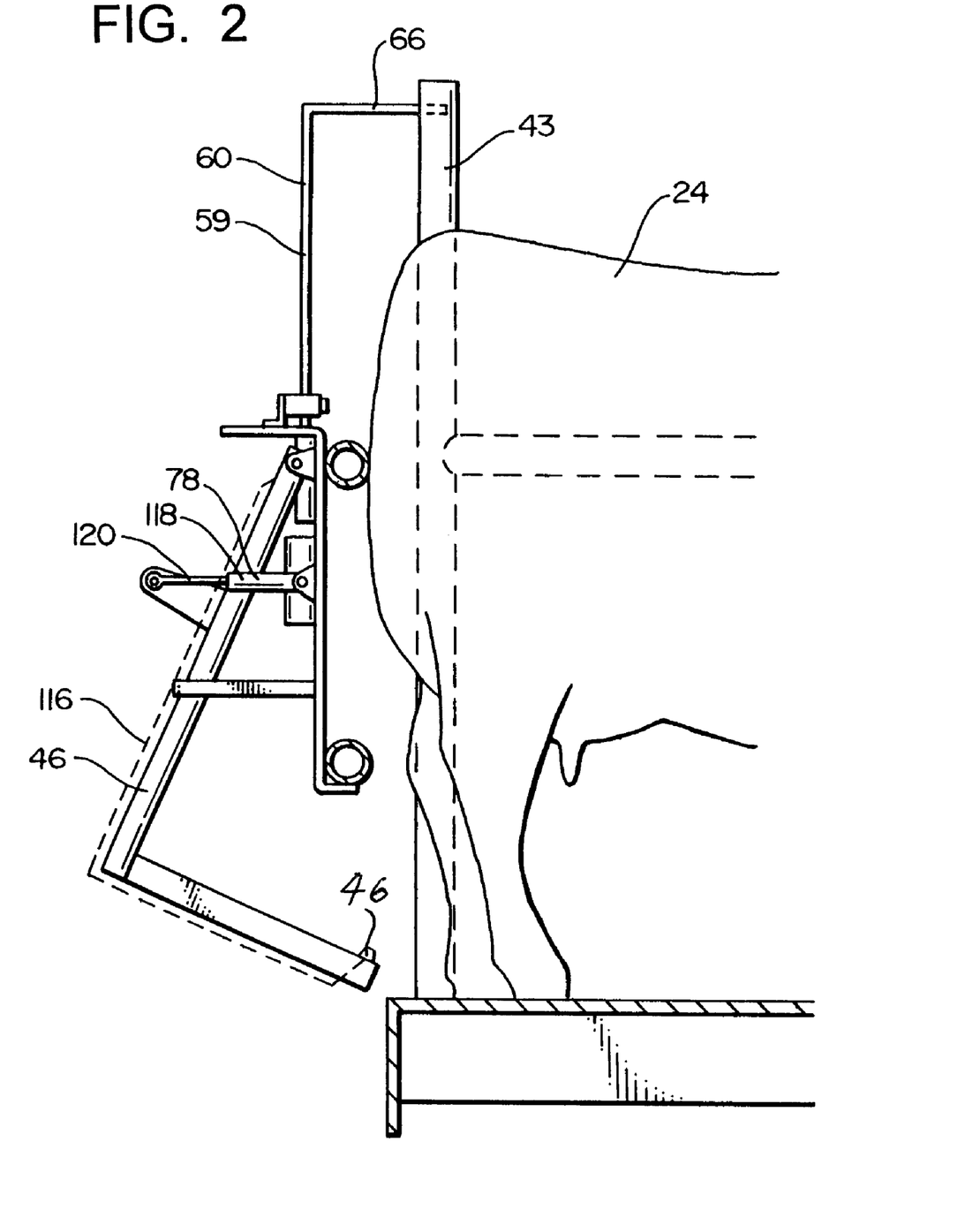
FIG. 2 is a side elevation view of a cow udder cleaning apparatus that is attached to the perimeter railing of a milking operation with the cleaning arm of the present invention in its retracted position.
Figure 3:
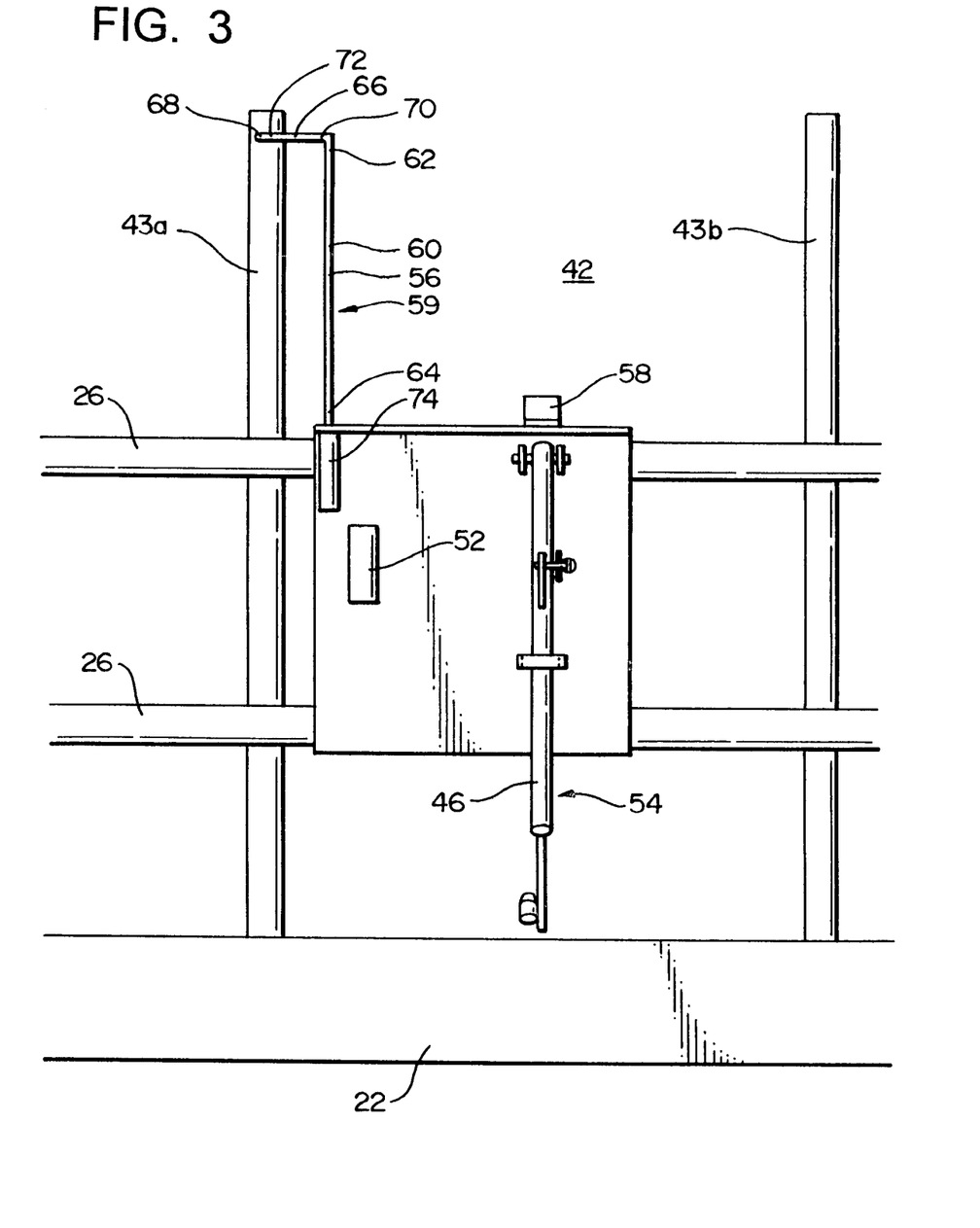
FIG. 3 is a rear view of a cow udder cleaning apparatus, looking inwardly toward the center of the platform of the milking parlor.
Figure 4:
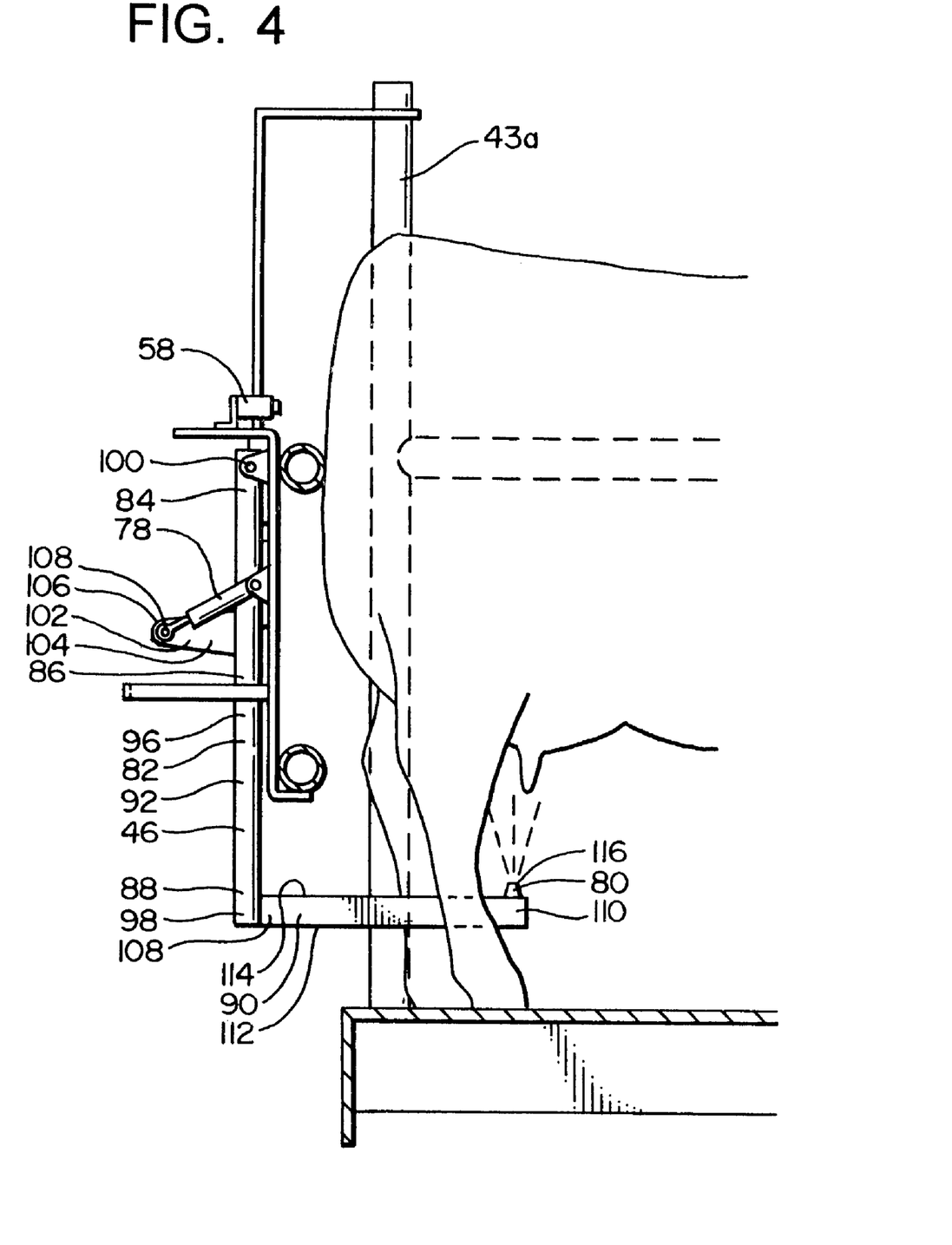
FIG. 4 is a side elevational view of the cow udder cleaning apparatus where the swing arm member is positioned in between a cow's legs and is dispersing a disinfectant.

The cow udder cleaning device 28 is shown in detail in FIGS. 2–4. The main components are a vertical mounting plate 48, a sensor system 50, a processor (or control system or solenoid processor) 52, and a positioning system 54.

The mounting plate 48 is rigidly attached to the perimeter railing 26 which is stationary. The mounting plate 48 functions as a base plate to which all the key components of the cow udder cleaning system 28 are mounted thereon.

In the preferred embodiment the sensor system 50 comprises two sensors, a contact sensor 56 and an optical sensor 58. Both of the sensors provide data input to the processor 52. The contact sensor 56 comprises a sensing contact member 59 which comprises a vertical stem portion 60 that extends upwardly from the upper part of the mounting plate 48, and has an upper end 62 and a base end 64 by which it is mounted for limited rotation about its vertical axis. A horizontal arm 66 is connected by it base end 70 to the upper end 62 of the vertical stem portion 60, and comprises a radially inward swing end 68, a base end 70 and a contact surface 72. The contact sensor 56 further comprises a sensor 74 connected to the base end 64 of the vertical stem 60. The sensor 74 is responsive to rotation of the vertical stem 60. When the contact surface 72 of the horizontal arm 66 is engaged by one of the posts 44, the arm rotates to rotate the vertical stem 60 to cause the sensor 74 will send a signal to indicate that one of the stalls 42 has arrived at its disinfecting location.

In the preferred form, the second sensor 58 is an optical sensor with a function to detect if a cow is located in a stall. The optical sensor 58 emits electromagnetic radiation in the non-visible frequency range and the sensor 58 will detect rebounding electromagnetic waves. Of course, other distance measure sensors that detect if an object is present within a certain distance could be employed. The sensor 58 will also send its data to processor 52 for data analysis.

Thus, when the contact sensor 56 and the optical sensor 58 provide the signals that the stall 42 is in the operating position and a cow is present, the processor 52 initiates the disinfecting process.

The operating or positioning system 54 has a primary function to place the swing arm 46 in its disinfecting position as shown in FIG. 4 in between a cow's legs and to cause the iodine (or other cow udder cleaning fluid) to be discharged through the nozzle 47 in a vertical direction on cow's udder.

In the preferred form, the positioning system 54 comprises the aforementioned swing arm 46, an actuator (actuating mechanism) 78, and a dispersion portion 80 comprising the nozzle 47. The swing arm 46 comprises a vertical arm portion 82, an upper portion 84, a middle portion 86 and a lower portion 88. The swing arm 46 further comprises a horizontal arm member 90 that is located in the lower portion 88 and a vertical member 92. The upper portion 44 of the vertical arm portion 86 is pivotally connected at 100 to the upper part of the mounting plate 48, so as to be able to rotate radially inward and outwardly. The radially inward and outward motion is referred to the path of travel of the swing arm 47 shown as dashed line 53. The path of travel 53 of the swing arm (or extension arm) 47 has an inward portion (or cleaning position or dispersion position) 55 that is substantially below the cow's udder and a withdrawn portion (or retracted position) 57 that is radially outward from the stall 42 and clear from any rotating member of the plate 22 such as the posts 43. The cleaning position or dispersion position is any location along the path of travel of the extension arm from the retracted position to the cleaning position where the dispersion portion can adequately spray material onto the cow's udder. An extension 102 is fixedly connected in the middle portion 86 of the vertical member 82 and extends radially outward therefrom and comprises a base connecting portion 104 and an outer portion 106. A pivot means 108 is located at the outer portion 106 and is attached to the actuating member 78.

The horizontal member (extension arm) 90 which is located at the lower portion 88 of the vertical arm portion 88, comprises a base end 109, and inward end (fluid dispensing portion) 110, a lower portion 112 and an upper portion 114. The horizontal member 90 is preferably made from a flexible material to withstand the potential abuse from the cow's hooves. The horizontal member 90 should also be relatively thin in the tangential direction so that it can more easily slip in between the cow's hind legs.

The dispersion portion (cleaning fluid dispensing portion) 80 is located at the inward end 110 of the horizontal member 90, and (as indicated previously comprises the vertically mounted nozzle 47. The nozzle 47 is in communication with a disinfectant section which comprises a disinfectant source connected to the nozzle 47 by a hose or disinfectant line (indicated by the broken line 116) which holds disinfectant fluid (such as iodine) and is adapted to disburse this disinfectant fluid in a fanlike or expanding spray like manner as shown in FIG. 4.

The actuator (actuating system) 78 comprises a cylinder portion 118 and a piston rod 120. The actuator can be driven by a hydraulic fluid or gas. When the actuator is in the position as shown in FIG. 2 the internal cylinder is pressurized and the force exerted on the piston rod 120 moves the swing arm 46 radially outwardly to the position of FIG. 2.

When the pressure is released within the actuator 78 the swing arm 46 will rotate about pivot location 100 radially inwardly to a position shown in FIG. 4. Alternatively actuator 78 could have an internal spring which biases the piston rod 120 to the position shown in FIG. 2, and when pressure is applied to the cylinder within the actuator 78 the piston rod 120 will retract to within the cylinder portion 118 and hence move the swing arm 46 radially inwardly to the position shown in FIG. 4. In the preferred embodiment the former arrangement of the actuator 78 is employed.

There will now be a more detailed discussion of the operation of the cow under cleaning apparatus 28. As mentioned earlier, the cow udder cleaning apparatus 28 is located in the udder cleaning location 38 of the milking parlor 20, and it is the final stage of the milking operation. It should be noted that the milking operation is essentially a continuous one, meaning the rotating platform 22 constantly rotates and the cows 24 continuously enter onto and exit from the rotating platform 22. It should be noted that the apparatus could be used before the milking operation begins and the apparatus of the present invention could be located an a variety of locations around the rotating platform 22.

We will now describe the cow udder cleaning apparatus when a single stall 42 is rotating to the cleaning location in front of the cow udder cleaning apparatus 28. As shown in FIG. 3, when this stall 42 moves clockwise, as seen in FIG. 2, the contact surface 72 of the contact sensor 56 comes in contact with the vertical post 43a (or other member in proximity to the stall 42. It should be noted, that in FIG. 3 the perimeter railing 26 and the mounting plate or structure (base platform) 48 attached thereon are stationary, and the rotating plate 22 and vertical bars 43 our rotating and hence moving to the left at a relatively slow speed of 0.2 to 0.9 mph.

Now to return to the discussion of the operation of the cow udder cleaning apparatus 28, when the contact member 59 is rotated about the vertical stem portion 60 of the same, the sensor 74 passes this information to the processor 52. The next step is that the processor 52 will now take a reading from the optical sensor 58 to detect if a cow is present in the stall 42 at the cleaning location (operating location). As shown in FIG. 3, if there is not a cow in the stall 42, the sensor 58 would detect the lack of a presence of a cow in the stall 42 and relay this back to the processor 52. Then the processor 52 will take no action for the positioning system (cleaning section) 54 and will be ready for the next signal sent from the contact sensor 60 which would indicate the next stall is in position. Of course the cleaning or sanitizing operation could take place without the optical sensor 58; however, the spraying action would take place regardless if a cow is present in the stall or not.

Now we will discuss the operation of the cow udder cleaning operation where instead the stall 42 being empty, there is a cow located therein as shown in FIGS. 2 and 4. Now after the contact sensors 60 comes in contact with vertical post 43a and delivers a signal to processor 52, the processor 52 will then get a reading from optical sensor 58 which will indicate the presence of a cow in the stall 42 as shown in FIG. 2. The next step of the processor 52 is to reduce the pressure that is supplied to the actuator 78. As mentioned before, the actuator 78 has a bleed line which allows a small amount of fluid or gas to escape from its internal cylinder. This allows for a slow steady swing of the swing arm 46 so the swing arm will pivot about pivot portion 100 to a position shown in FIG. 4.

As the swing arm 46 is rotating slowly into the cleaning position of FIG. 4, the processor 52 takes an additional step of providing pressure to the disinfectant line 116 (shown in FIG. 2 only) that is in communication with the nozzle 47. The disinfectant line is in communication with the disinfectant source (i.e. a storage tank which is not shown), that holds a supply of disinfectant which is generally iodine. When the disinfectant line is pressurized, disinfectant will be emitted from nozzle 47. Therefore as the swing arm 46 moves the horizontal member 90 in between the cow's hind legs the nozzle 47 is spraying the disinfectant which covers the cow's udder from rear to front. When the swing arm 46 is in the position shown in FIG. 4, the actuator 78 is pressurized and the piston rod 120 will extend radially outwardly and begin to rotate swing arm 46 back to the position shown in FIG. 2. While the swing arm is being withdrawn from in between the cow's hind legs, pressure to the disinfectant line is maintained and the nozzle 116 will spray a second coat of disinfectant on the cow's udder as the horizontal member 90 withdraws. When the swing arm 46 is near the position as shown in FIG. 2, the processor 52 cuts the pressure to the disinfectant line and the nozzle 47 ceases to emit disinfectant. At this point the processor 52 is ready to receive a signal from the contact sensor 56 when the next stall is in the cleaning location.

The nozzle 47 could further emit a powder substance that is mixed in with compressed air so that when the compressed air flows through the disinfectant line (not shown), the powder material will emit in a vertical direction on the cow's udder. Compressed air could also be used with a cleaning or disinfecting liquid such as iodine so that the dispersion pattern and concentrations of iodine are more desirable.

Although two sensors are employed in the present invention, the important aspect of the sensing system 50 is that it can detect the presence and location of a cow so that the extension arm's 90 path of travel will be guided through the cow's hind legs.

Figure 5:
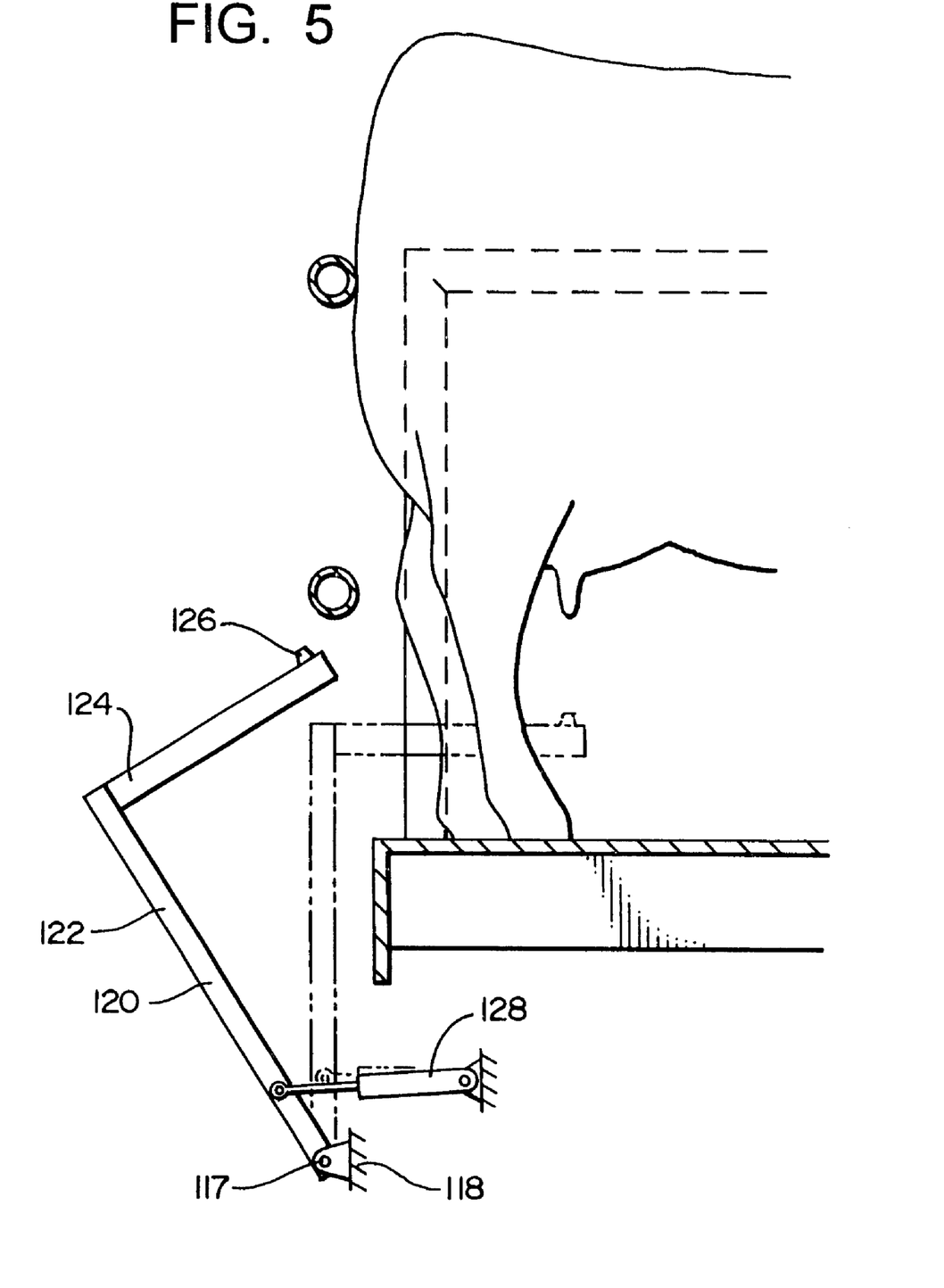
FIG. 5 is a side elevational view of a second embodiment of the apparatus of the present invention.

FIG. 5 discloses a second embodiment which is substantially similar to the first embodiment except instead of having pivot portion 100 in a position above the horizontal member 90, the pivot portion 117 is positioned onto a fixed a mounting structure 118. The arm 120 comprises a first portion 122 and an upper portion 124 (extension arm). Located at the radially inward portion of upper portion 124 is a nozzle extension (fluid extension) 126 which is in communication with a pressure line which interns in communication with a supply of disinfectant. The actuator 128 operates a substantially similar manner as the actuator 78 in the first embodiment.

Figure 6:
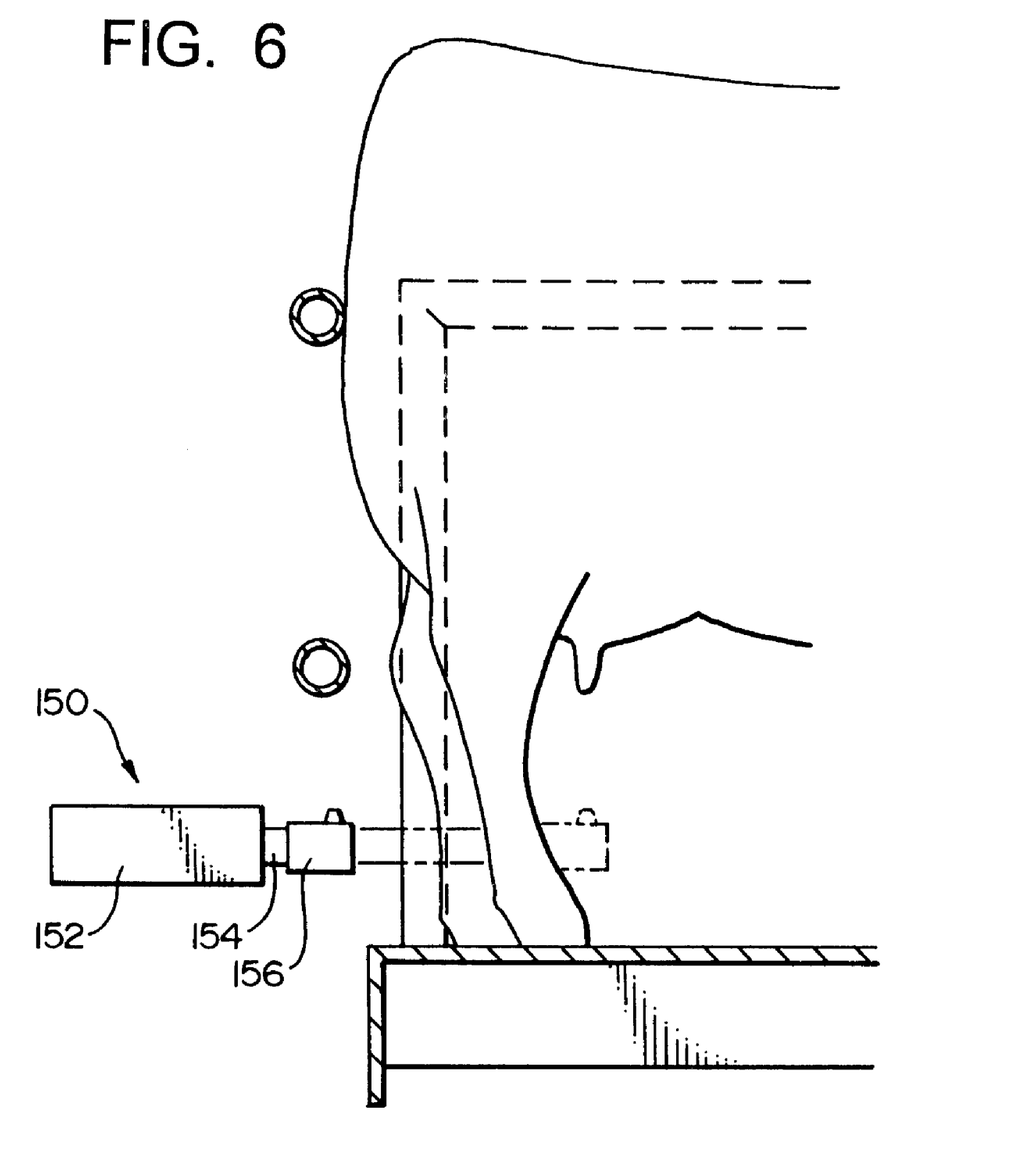
FIG. 6 is a side elevational view of a third embodiment of the apparatus of the present invention.

FIG. 6 shows a third embodiment where the apparatus of the present invention 150 comprises a control unit 152, an actuating member 154, and an extension arm 156. The control unit 152 comprises a processor, a sensing system, and a switch. The operation of the third embodiment is substantially similar to the previous embodiments. The sensing system is designed to detect a certain amount of radial rotation of the rotating plate 22. Of course there are a number of ways of accomplishing this. For example, there could be an assortment of indicating marks which have a radial distance between them to correspond to the radial width of a stall. The sensing system would detect the rotation of an indicating mark which would indicate a stall is in position for the cleaning process to occur. Further, a rotational sensing transducer could be employed to indicate a certain amount of rotation of the rotating plate 22 and this information could be transmitted to the processor of the control unit 152. It is advantageous to use a cow detecting sensor in addition to a rotational sensor so to prevent the nozzle from disbursing disinfectant fluid into the air when a cow is not present in the stall.

The actuating systems 154 could be accomplished by a variety of methods such as but not limited to pneumatic cylinders, hydraulic cylinders, electromagnetic force, IC engine, etc. the important aspect of the actuating means is that it positions the dispersion portion 158 relatively quickly underneath the cow's udder and is withdrawn relatively quickly. Acceptable times to complete that operation would be in the ranges of 0.2 seconds to 1.25 seconds.

The extension arm 156 has a dispersion portion 158 where a nozzle 160 is located. It is desirable to have the extension arm relatively thin in the tangential direction so as it can easily be positioned between the hind legs of the cow.

Figure 7:
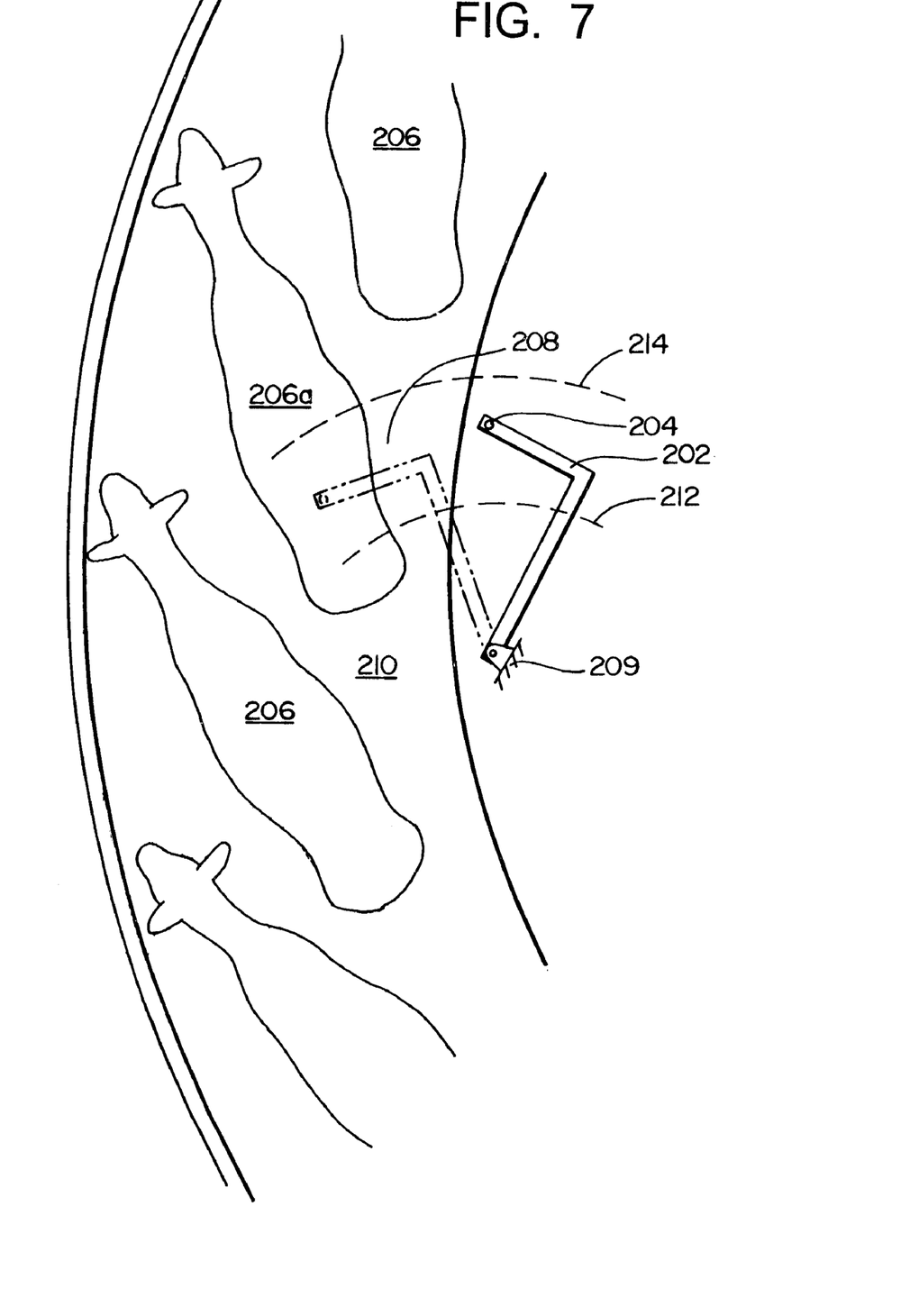
FIG. 7 is a fourth embodiment of the apparatus of the present invention where it is employed in a herringbone design rotary platform parlor.

FIG. 7 shows a fourth embodiment where the apparatus of the present invention is positioned in the center portion in a circular herringbone parlor. The apparatus 200 is similar to the previous embodiments; however, the extension arm 202 travels substantially in a horizontal plane to have the dispersion section 204 to be in the fully inserted cleaning position as shown by the hatched line of extension arm 202.

The cows 206 in FIG. 7 have an open portion 208 exposed that allows access for the extension arm to 202 to extend thereunder. By placing the base platform 209 in the center portion of the rotating plate 210, the apparatus 200 can take advantage of the open portion defined by hatched lines 212 and 214 to get access to the cleaning position which is located under the cows udder when the cow 206a is in the cleaning position as seen in FIG. 7.

As in the previous embodiments the apparatus 200 would have a rotational sensing system and actuator to position the arm 202.

Figure 8:
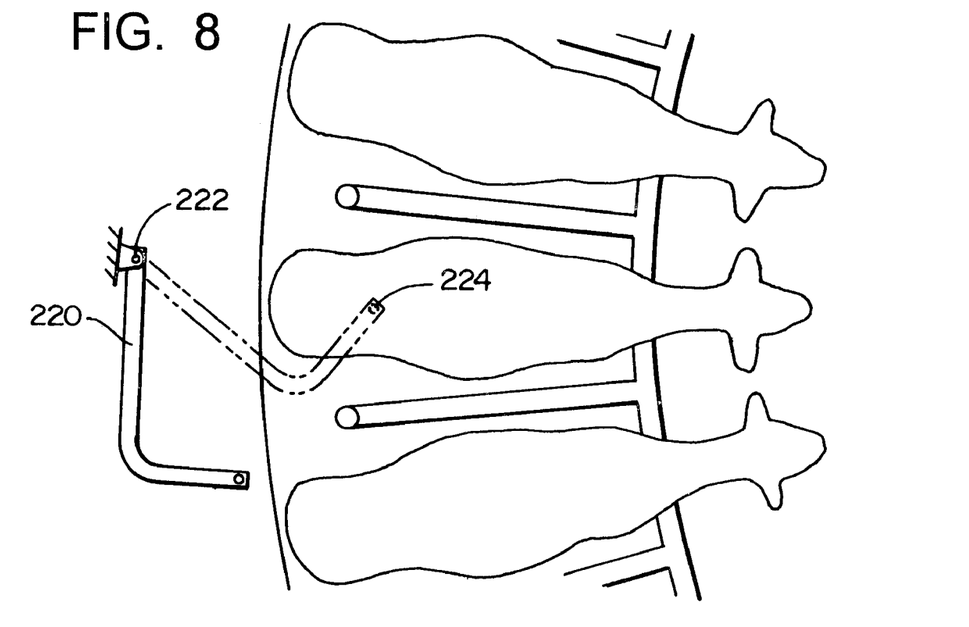
FIG. 8 is a fifth embodiment where the apparatus of the present invention is employed in a circular milking parlor where the swing arm rotates in the horizontal plane to the side portion of the cow.

FIG. 8 shows a fifth embodiment of the present invention where the apparatus's swing arm or cleaning section 220 pivots in the substantial horizontal plane about point 222. As seen in FIG. 8, the swing arm 220 is in a retracted position as indicated by the solid lines. When the swing arm is in a cleaning position where the nozzle 224 is positioned substantially underneath the cow's udder.

Figure 9:
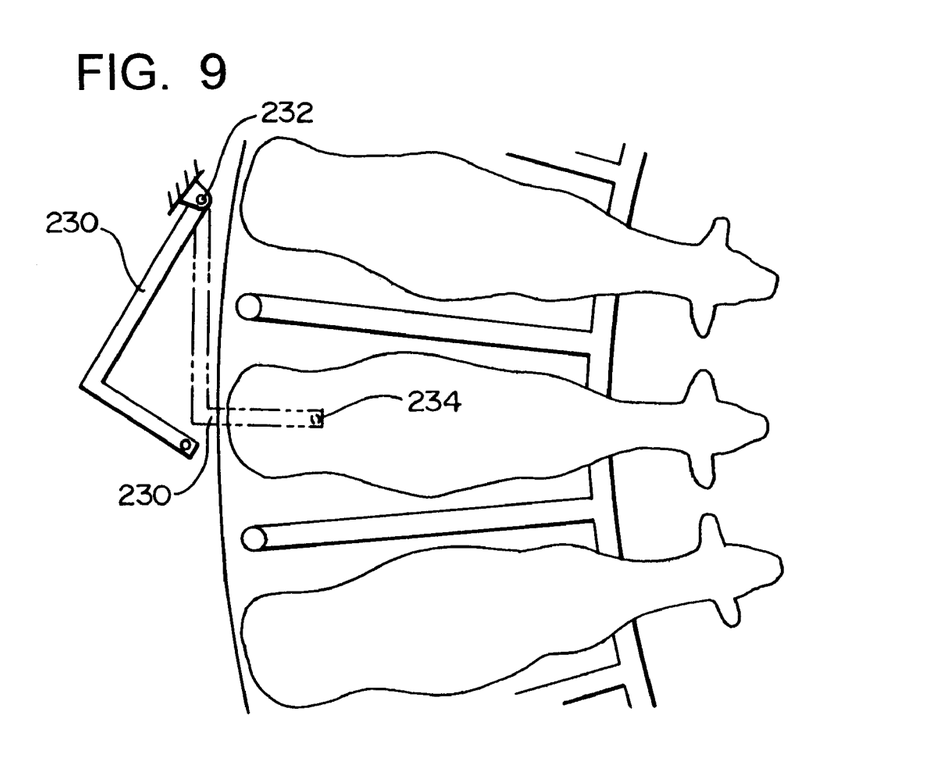
FIG. 9 is a sixth embodiment where the apparatus of the present invention is employed in a circular milking parlor where the swing arm also rotates in a horizontal plane but the extension travels between the hind legs of the cow.

FIG. 9 illustrates a sixth embodiment where the apparatus's swing arm or cleaning section 230 pivots in the substantial horizontal plane about point 232. The swing arm 230 is in a retracted position as indicated by the solid line, and in a cleaning position as indicated by the broken line. When in a cleaning position the nozzle 230 for a positioned substantially underneath the udder of the cow.

The fifth and six embodiments of course have an actuating system to position the cleaning section in a cleaning position and in a retracted position. Further, a sensor is employed to detect the rotational position of the plate the cows are standing on.

The important aspects of the invention is the ability to position a dispensing portion of an extension arm into a cleaning or dispersion position underneath the cow's udder so the dispensing portion can disburse fluid or powder thereon the cow's udder.

While the invention is susceptible of various modifications and alternative forms, specific embodiments thereof have been shown by way of example in the drawings as herein described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A system for cleaning udders of cows in a milking parlor, where there is a plurality of milking stalls arranged on a moving platform to move through a milking cycle, and said parlor comprises a milk extracting region where milking machines extract milk, and an exit location, said system comprising:

a) an udder cleaning apparatus positioned at a cleaning location intermediate the milk extracting location and the exit location, with said stalls passing by said cleaning location, said cleaning apparatus comprising:
        i) a mounting structure at the cleaning location;
        ii) a cleaning section which is movable between a retracted position which is out of a path of travel of the stalls and a cleaning position when the cleaning section discharges cleaning fluid to clean an udder of the cow which is in a stall which is at the cleaning location;
    b) a control section comprising a location sensor responsive to location of the stalls and to provide signals identifying arrival times at which each of the stalls is at the cleaning location, said control section being arranged to cause the cleaning section to move, relative to the arrival times, from the retracted position to the cleaning position to discharge said cleaning fluid toward the udder of the cow, then to retract the cleaning section form the cleaning position to complete a cleaning cycle, and when the stall in the cleaning location moves from the cleaning location, to again cause the cleaning section to move to the cleaning position to initiate a subsequent cleaning cycle as a following stall is arriving at the cleaning location.

2. The system as recited in claim 1, wherein said control section further comprises a presence detector to detect the presence of a cow in a stall which is at the cleaning location.

3. The system as recited in claim 2, whereas said presence detector comprises an electromagnetic detector which directs an electromagnetic wave toward the stall at the cleaning location and responds to the electromagnetic wave encountering a cow in the stall at the cleaning location to permit the cleaning cycle to take place.

4. The system as recited in claim 1, wherein said location sensor responds to location elements which are arranged to move synchronously with said moving platform and are at spaced locations corresponding to spacing of said stalls.

5. The system as recited in claim 4, whereas said location sensor is a contact sensor and said location elements are arranged to come into contact with said location sensor as said platform moves.

6. The system as recited in claim 5, wherein said location elements are physical components of the milking parlor which move sequentially into engagement with the location sensor during movement of the platform.

7. The system as recited in claim 1, wherein said cleaning section comprises an extension arm on which a cleaning fluid dispensing portion is positioned, and said extension arm moves on a path of travel from the retracted position to the cleaning position where at least a portion of said extension arm is beneath the cow which is in the stall at the cleaning location.

8. The system as recited in claim 7, wherein said extension arm is arranged so that the path of travel extends between two legs of the cow.

9. The system as recited in claim 8, wherein said path of travel extends between two hind legs of the cow.

10. The system as recited in claim 8, wherein said extension arm is arranged so that the path of travel extends between a front leg and a hind leg of the cow.

\* \* \* \* \*

(12) EX PARTE REEXAMINATION CERTIFICATE (8808th)
United States Patent
DeWaard (10) Number: US 6,443,094 C1
(45) Certificate Issued: Jan. 17, 2012

(54) METHOD AND APPARATUS FOR CLEANING THE UDDER OF A COW

(75) Inventor: Dave DeWaard, Lynden, WA (US)

(73) Assignee: Daritech, Inc., Lynden, WA (US)

Reexamination Request:
No. 90/011,755, Jun. 29, 2011

Reexamination Certificate for:
Patent No.: 6,443,094
Issued: Sep. 3, 2002
Appl. No.: 09/698,433
Filed: Oct. 25, 2000

Related U.S. Application Data

(60) Provisional application No. 60/170,153, filed on Dec. 10, 1999.

(51) Int. Cl.
*A01J 5/00* (2006.01)
*A01J 3/00* (2006.01)

(52) U.S. Cl. .................................................. 119/14.18

(58) Field of Classification Search .................... None
See application file for complete search history.

(56) References Cited

To view the complete listing of prior art documents cited during the proceeding for Reexamination Control Number 90/011,755, please refer to the USPTO's public Patent Application Information Retrieval (PAIR) system under the Display References tab.

*Primary Examiner* — Beverly M. Flanagan (57) ABSTRACT

A method apparatus for teat dipping for sanitizing the udder of a cow either before or after milking. The apparatus has an extension arm with a dispersion portion so that when a cow is in a cleaning location the extension arm will extend underneath a cow's udder and dispersed cleaning fluid onto the cow's udder. A sensing system is used that detects the rotation of the parlor to determine if a cow is at a cleaning location. Further, the sensing system detects whether a cow is present in a stall of the rotary milking parlor.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *

(12) EX PARTE REEXAMINATION CERTIFICATE (9724th)
United States Patent
DeWaard (10) Number: US 6,443,094 C2
(45) Certificate Issued: Jun. 26, 2013

(54) METHOD AND APPARATUS FOR CLEANING THE UDDER OF A COW

(75) Inventor: Dave DeWaard, Lynden, WA (US)

(73) Assignee: Daritech, Inc., Lynden, WA (US)

Reexamination Request:
No. 90/012,285, May 8, 2012

Reexamination Certificate for:
Patent No.: 6,443,094
Issued: Sep. 3, 2002
Appl. No.: 09/698,433
Filed: Oct. 25, 2000

Reexamination Certificate C1 6,443,094 issued Jan. 17, 2012

Related U.S. Application Data

(60) Provisional application No. 60/170,153, filed on Dec. 10, 1999.

(51) Int. Cl.
*A01J 5/00* (2006.01)
*A01J 7/04* (2006.01)
*A01J 5/17* (2006.01)
*A02J 7/00* (2006.01)

(52) U.S. Cl.
USPC .................................................... 119/14.18

(58) Field of Classification Search
None
See application file for complete search history.

(56) References Cited

To view the complete listing of prior art documents cited during the proceeding for Reexamination Control Number 90/012,285, please refer to the USPTO's public Patent Application Information Retrieval (PAIR) system under the Display References tab.

*Primary Examiner* — Jeffrey L. Gellner (57) ABSTRACT

A method apparatus for teat dipping for sanitizing the udder of a cow either before or after milking. The apparatus has an extension arm with a dispersion portion so that when a cow is in a cleaning location the extension arm will extend underneath a cow's udder and dispersed cleaning fluid onto the cow's udder. A sensing system is used that detects the rotation of the parlor to determine if a cow is at a cleaning location. Further, the sensing system detects whether a cow is present in a stall of the rotary milking parlor.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-10, dependent on an amended claim, are determined to be patentable.

1. A system for cleaning udders of cows in a milking parlor, where there is a plurality of milking stalls arranged on a moving platform to move through a milking cycle, and said parlor comprises a milk extracting [region] *location* where milking machines extract milk, and an exit location, said system comprising:

a) an udder cleaning apparatus positioned at a cleaning location intermediate the milk extracting location and the exit location, with said stalls passing by said cleaning location, said cleaning apparatus comprising:
  i) a mounting structure at the cleaning location;
  ii) a cleaning section which is movable between a retracted position which is out of a path of travel of the stalls and a cleaning position when the cleaning section discharges cleaning fluid to clean an udder of the cow which is in [a stall] *one of said stalls* which is at the cleaning location;
b) a control section comprising a location sensor responsive to location of the stalls and to provide signals identifying arrival times at which each of the stalls is at the cleaning location, said control section being arranged to cause the cleaning section to move, relative to the arrival times, from the retracted position to the cleaning position to discharge said cleaning fluid toward the udder of the cow, then to retract the cleaning section from the cleaning position to complete a cleaning cycle, and when the stall in the cleaning location moves from the cleaning location, to again cause the cleaning section to move to the cleaning position to initiate a subsequent cleaning cycle as a following stall is arriving at the cleaning location.

\* \* \* \* \*